(12) United States Patent
Leonard et al.

(10) Patent No.: US 8,082,494 B2
(45) Date of Patent: Dec. 20, 2011

(54) RENDERING MARKUP LANGUAGE MACRO DATA FOR DISPLAY IN A GRAPHICAL USER INTERFACE

(75) Inventors: Arthur C. Leonard, Redmond, WA (US); Timothy E. Getsch, Redmond, WA (US); Michael J. McCormack, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 908 days.

(21) Appl. No.: 12/105,686

(22) Filed: Apr. 18, 2008

(65) Prior Publication Data

US 2009/0265610 A1 Oct. 22, 2009

(51) Int. Cl.
*G06F 17/00* (2006.01)
*G06F 9/44* (2006.01)

(52) U.S. Cl. ........ 715/234; 715/724; 715/760; 715/770; 719/220

(58) Field of Classification Search .......... 715/200–205, 715/207, 209, 210, 212, 226, 227, 228, 231, 715/234, 239, 254, 255, 700, 704, 716, 724, 715/760, 765, 769, 770; 717/110, 111, 115, 717/116; 719/310, 320, 328
See application file for complete search history.

(56) References Cited

U.S. PATENT DOCUMENTS

| | | | |
|---|---|---|---|
| 6,466,240 B1 * | 10/2002 | Maslov | 715/234 |
| 6,590,589 B1 | 7/2003 | Sluiman et al. | |
| 6,912,692 B1 * | 6/2005 | Pappas | 715/762 |
| 6,941,521 B2 | 9/2005 | Lin et al. | |
| 7,219,305 B2 | 5/2007 | Jennings | |
| 7,222,292 B2 | 5/2007 | Ali et al. | |
| 7,421,654 B2 * | 9/2008 | Wugoski | 715/704 |
| 7,873,663 B2 * | 1/2011 | Willis et al. | 707/791 |
| 2002/0103597 A1 * | 8/2002 | Takayama et al. | 701/200 |
| 2002/0152244 A1 | 10/2002 | Dean et al. | |
| 2005/0057560 A1 | 3/2005 | Bibr et al. | |
| 2005/0091603 A1 * | 4/2005 | Chen et al. | 715/769 |
| 2005/0193370 A1 | 9/2005 | Goring et al. | |
| 2005/0193380 A1 | 9/2005 | Vitanov et al. | |
| 2006/0248451 A1 | 11/2006 | Szyperski et al. | |
| 2006/0285656 A1 | 12/2006 | Saborowski et al. | |
| 2007/0130205 A1 | 6/2007 | Dengler et al. | |
| 2008/0282139 A1 * | 11/2008 | Davis | 715/205 |

OTHER PUBLICATIONS

IBM Reflexive User Interface Builder, IBM, Jul. 16, 2004, pp. 1-2. http://www.alphaworks.ibm.com/tech/rib.
Matthias Clausen: "An XML Driven Graphical User Interface and Application Management Toolkit"; SLAC-PUB, THCT005, Jan. 2002, pp. 1-3 http://arxiv.org/ftp/physics/papers/0111/0111057.pdf.

* cited by examiner

*Primary Examiner* — Maikhanh Nguyen
(74) *Attorney, Agent, or Firm* — Merchant & Gould

(57) ABSTRACT

Embodiments are provided for rendering markup language data representing a macro as macro objects in a graphical user interface on a display device and for converting macro objects to markup language data. In one embodiment, markup language data representing the macro from a data source may be translated into macro objects for display in the graphical user interface in response to receiving a paste command in an application program. The macro objects visually represent the macro. The application program may automatically convert the markup language data into the macro objects. The macro objects are then automatically rendered in the graphical user interface. In another embodiment, a selection of macro objects displayed in the graphical user interface may be received via a copy command in the application program. In response to receiving the copy command, the application program may automatically convert the selected macro objects into markup language data.

15 Claims, 10 Drawing Sheets

Many users have a need to calculate the time elapsed between a start time and an end time. In order to do that you'll need to use an Access Macro. Taker the following XML and paste it into a stand alone macro

```
<?xml version="1.0" encoding="utf-8" ?>
<Macro
xmlns="http://schemas.microsoft.com/office/accessservic
es/2009/application">
    <Statements>
```

[Copy] 315

Then copy this macro into the event that will generate the Time Elapsed string

```
<Macro
xmlns="http://schemas.microsoft.com/office/accessservi
```

[Copy] 325

*FIGURE 3*

RENDERING MARKUP LANGUAGE MACRO DATA FOR DISPLAY IN A GRAPHICAL USER INTERFACE

BACKGROUND

Computer users may automate various software application tasks through the use of one or more logical structures or macros. For example, a user may desire to open a data entry form when a button is clicked. The user may automate this process in the application by a series of statements or commands using a programming language (e.g., a macro language). The series of statements or commands may thus comprise a macro.

Typically, the sharing of macros is limited in that macro statements may not be easily transferred between different software applications. Thus, a macro created in a database application program using a particular programming language could not be rendered into a word processing application program which does not share the same language or understand the structure utilized in creating the macro unless the entire database containing the macro is transferred. Previous solutions to the problems with macro sharing have included converting the macro language in to an intermediate format, such as Visual Basic, which may be understood by multiple application programs. However, the use of an intermediate format requires knowledge of an additional programming language (in addition to the macro language) which may not easily be understood by all users. Furthermore, the use of the intermediate format is time consuming in that it requires a user to convert the macro structure by manually retyping the macro language into the intermediate format. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for rendering markup language data representing a macro as macro objects in a graphical user interface on a display device and for converting macro objects to markup language data. In one embodiment, markup language data representing the macro from a data source may be translated into macro objects for display in the graphical user interface in response to receiving a paste command in an application program. The macro objects visually represent the macro. The application program may automatically convert the markup language data into the macro objects. The macro objects are then automatically rendered in the graphical user interface. In another embodiment, a selection of macro objects displayed in the graphical user interface may be received via a copy command in the application program. In response to receiving the copy command, the application program may automatically convert the selected macro objects into markup language data.

These and other features and advantages will be apparent from a reading of the following detailed description and a review of the associated drawings. It is to be understood that both the foregoing general description and the following detailed description are illustrative only and are not restrictive of the invention as claimed.

BRIEF DESCRIPTION OF THE DRAWINGS

FIG. 3 is an illustrative computer screen display of markup language data prior to being pasted into a macro displayed on a macro design surface, in accordance with one embodiment;

DETAILED DESCRIPTION

Figure 1:
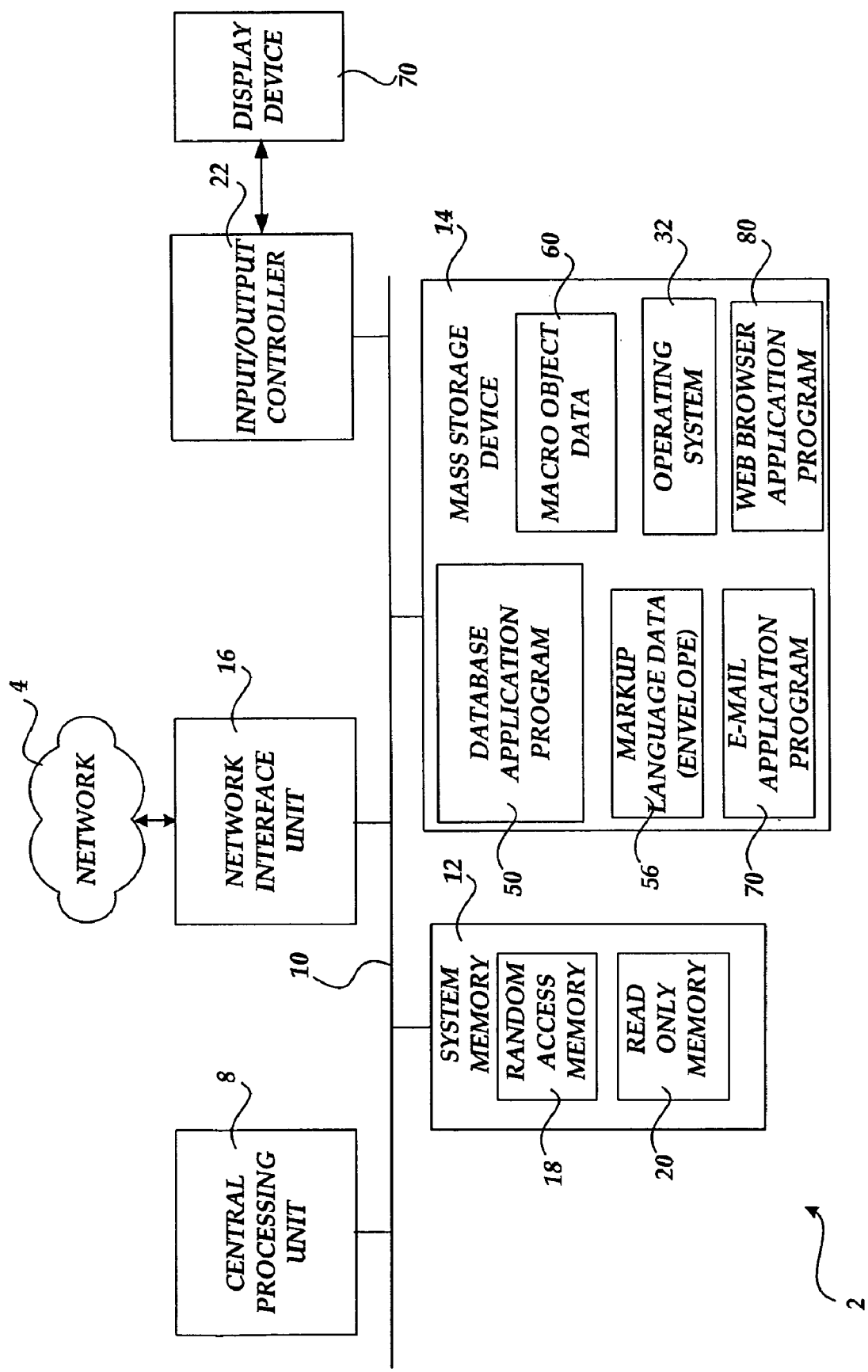
FIG. 1 is a block diagram illustrating a computing environment which may be utilized for rendering markup language data representing a macro as macro objects in a graphical user interface on a display device and for rendering the macro objects as markup language data, in accordance with various embodiments.

Embodiments are provided for rendering markup language data representing a macro as macro objects in a graphical user interface on a display device and for converting macro objects to markup language data. In one embodiment, markup language data representing the macro from a data source may be translated into macro objects for display in the graphical user interface in response to receiving a paste command in an application program. The macro objects visually represent the macro. The application program may automatically convert the markup language data into the macro objects. The macro objects are then automatically rendered in the graphical user interface. In another embodiment, a selection of macro objects displayed in the graphical user interface may be received via a copy command in the application program. In response to receiving the copy command, the application program may automatically convert the selected macro objects into markup language data.

Referring now to the drawings, in which like numerals represent like elements, various illustrative embodiments will now be described.

Exemplary Operating Environment

Referring now to FIG. 1, the following discussion is intended to provide a brief, general description of a suitable computing environment in which various illustrative embodiments may be implemented. While various embodiments will be described in the general context of program modules that execute in conjunction with program modules that run on an operating system on a personal computer, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with other computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 1 shows a computer 2 which may include a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, a database application program 50, markup language data 56, macro object data 60, an e-mail application program 70, and a web browser application 80. In accordance with various embodiments, the operating system 32 may be suitable for controlling the operation of a networked personal computer, such as the WINDOWS operating systems from MICROSOFT CORPORATION of Redmond, Wash. The database application program 50 may comprise the ACCESS database creation and management desktop application program, also from MICROSOFT CORPORATION of Redmond, Wash. The database application program 50 may be utilized to design logical structures or macros for automating various tasks associated with creating and managing databases. For example, a user may design a macro to calculate the time elapsed between a start time and an end time of a project created in a database. In accordance with various embodiments, the database application program 50 may be utilized generate a graphical user interface to render markup language data representing a macro as macro objects and to convert the macro objects as markup language data via cut/copy and paste operations in the user interface. Illustrative routines for rendering markup language data representing a macro as macro objects and for converting the macro objects as markup language data will be discussed in greater detail below with respect to FIGS. 9 and 10.

The markup language data 56 may include, but is not limited to, Extensible Markup Language ("XML") elements for representing and displaying macro objects in a shareable and human-readable form. In accordance with various embodiments, the markup language data 56 may comprise an "envelope" which is an XML structure for encasing logical objects (i.e., macro objects) which comprise the macro object data 60. In accordance with other embodiments, the XML elements making up the macro objects may be stored in a file on the computer 2, retrieved from an e-mail message displayed in the e-mail application 70, or retrieved from a web page displayed in the web browser application 80. It will be appreciated that, in accordance with an embodiment, the XML elements may be copied and pasted into a user interface generated by the database application 50 and rendered as a different structure (i.e., user interface macro objects) as if the user had typed them directly into the interface. Thus, the database application 50 may enable macros represented by the markup language data 56 to be utilized across a number of application platforms and formats.

The macro object data 60 may comprise a hierarchy of logical objects which may be utilized by the database application program 50 to create macros. In accordance with various embodiments, the macro object data 60 may include, but is not limited to, actions, comments, for loops, conditional operations, subroutines, and groups. The macro object data 60 will be described in greater detail below with respect to FIG. 2.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network or a wide area network (e.g., the Internet), for example. The computer 2 may connect to the network 4 through a network interface unit 16 connected to the bus 10. It should be appreciated by those skilled in the art that when operating in a networked environment, the computer 2 may be in communication with one or more remote servers hosting a shared database services platform such as the EXCEL/ACCESS SERVICES platform from Microsoft Corporation of Redmond, Wash. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display device 70, a printer, or other type of output device. Additionally, a touch screen can serve as an input and an output mechanism.

As mentioned briefly above, a number of program modules and data files may be stored in the mass storage device 14 and RAM 18 of the computer 2 such as the operating system 32. The mass storage device 14 and RAM 18 may also store one or more program modules. In particular, the mass storage device 14 and the RAM 18 may store the database application program 50, the markup language data 56, the macro object data 60, the e-mail application program 70, and the web browser application 80.

Figure 2:
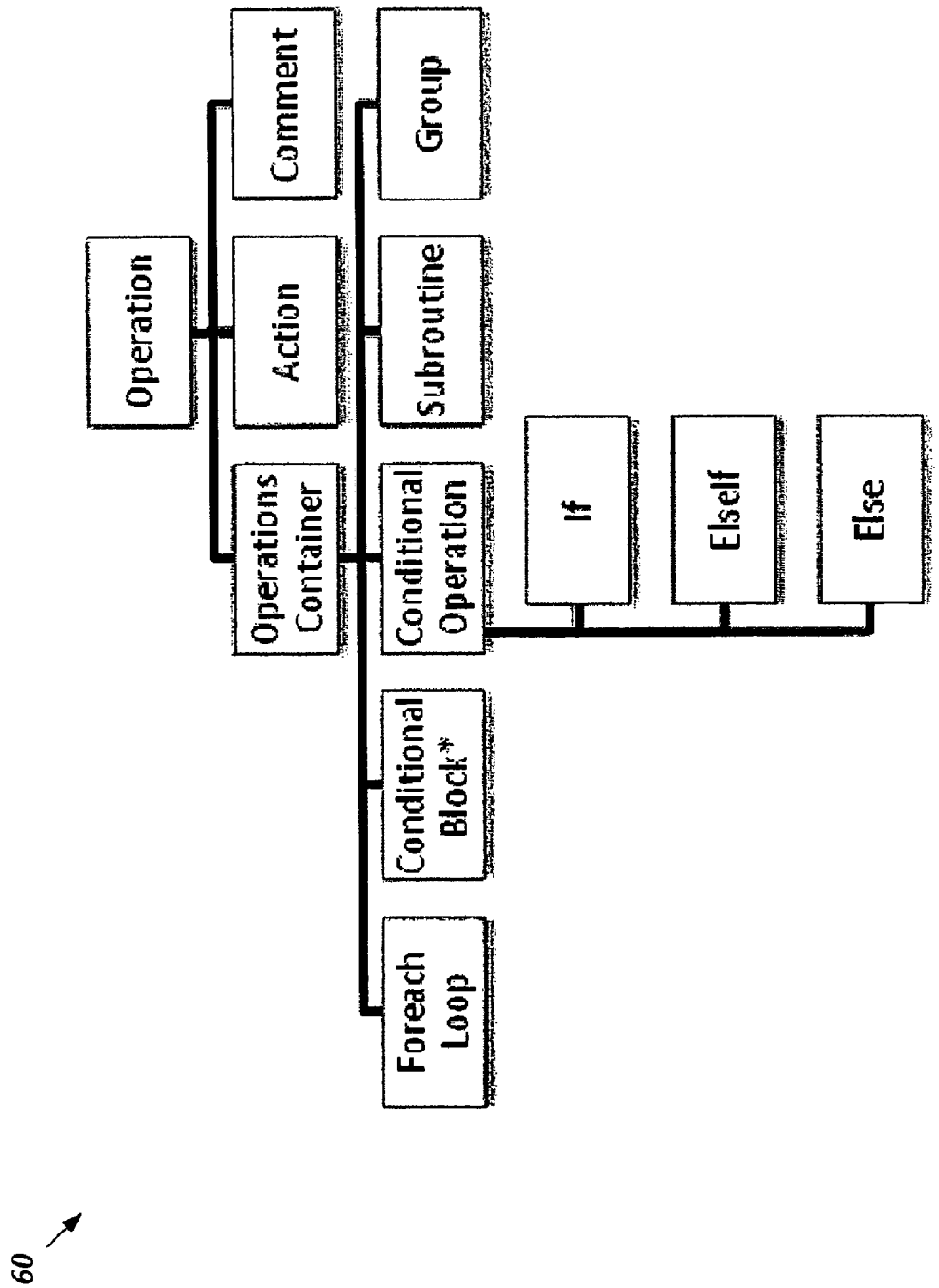
FIG. 2 is a block diagram of an object hierarchy for macro objects, in accordance with one embodiment.

FIG. 2 is a block diagram of an object hierarchy or macro tree for objects in the macro object data 60, in accordance with one embodiment. The objects may include various categories utilized in macros including, but not limited to, an Operation object 205, an Operations Container object 210, an Action object 215, a Comment object 220, a Foreach Loop object 225, a Conditional Block object 230, a Conditional Operation object 235, a Subroutine Object 240, a Group object 245, an If object 250, an ElseIf object 255, and an Else object 260.

In accordance with various embodiments, the Operation object 205 is a base-level object which may be utilized to define logic utilized in a macro. The Operations Container object 210 is an operation that may contain one or more Operations objects. The Action object 215 includes an action or command which may be executed in a macro. The Action object 215 may include a Name property (not shown) which describes the action type to be executed and a collection of arguments (not shown). The Comment object 220 may include descriptive and informative text that a user may put into macro programming code which is irrelevant to the execution of a macro. The Foreach Loop object 225 is derived from the Operations Container object 210 and may include the following properties (not shown): an AliasName property, an Alias Expression property, and a Where-clause property. The Conditional Block object 230 is derived from the Operations Container object 210 and is utilized to hold conditional statements (e.g., If statements in the If object 250, ElseIf statements in the ElseIf object 255, and Else statements in the Else object 260) which may used in a macro. In accordance with an embodiment, the Conditional Block object 230 may include a rule in which conditional statements may appear in a predetermined order (e.g., If before ElseIf and ElseIf before Else), be required or not required (e.g., If statements may be required in a macro while ElseIf and Else statements are not required), and limited or unlimited in number (e.g., any number of ElseIf statements may be allowed while only one Else statement and one If statement may be allowed in a macro). The Subroutine object 240 is derived from the Operations Container object 210 and may be a self-contained, self-terminating sub-macro. That is, all operations inside a sub-macro may be executed, but nothing outside of it.

FIG. 3 is an illustrative computer screen display 300 of the markup language data 56 prior to being pasted into a macro displayed on a macro design surface, in accordance with one embodiment. The markup language data 56 may include XML statements in accordance with a schema which are representative of a macro which may be executed in the database application program 50. The markup language data 56 may be copied to a "clipboard" facilitated by the operating system 32 using the Copy buttons 215 and 225 so that the markup language data 56 may be pasted into the database application program 50. It will be appreciated that in accordance with various embodiments, the display 300 may represent an external application program with respect to the database application program 50 such as the e-mail application program 70 or the web browser application program 80.

Figure 4:
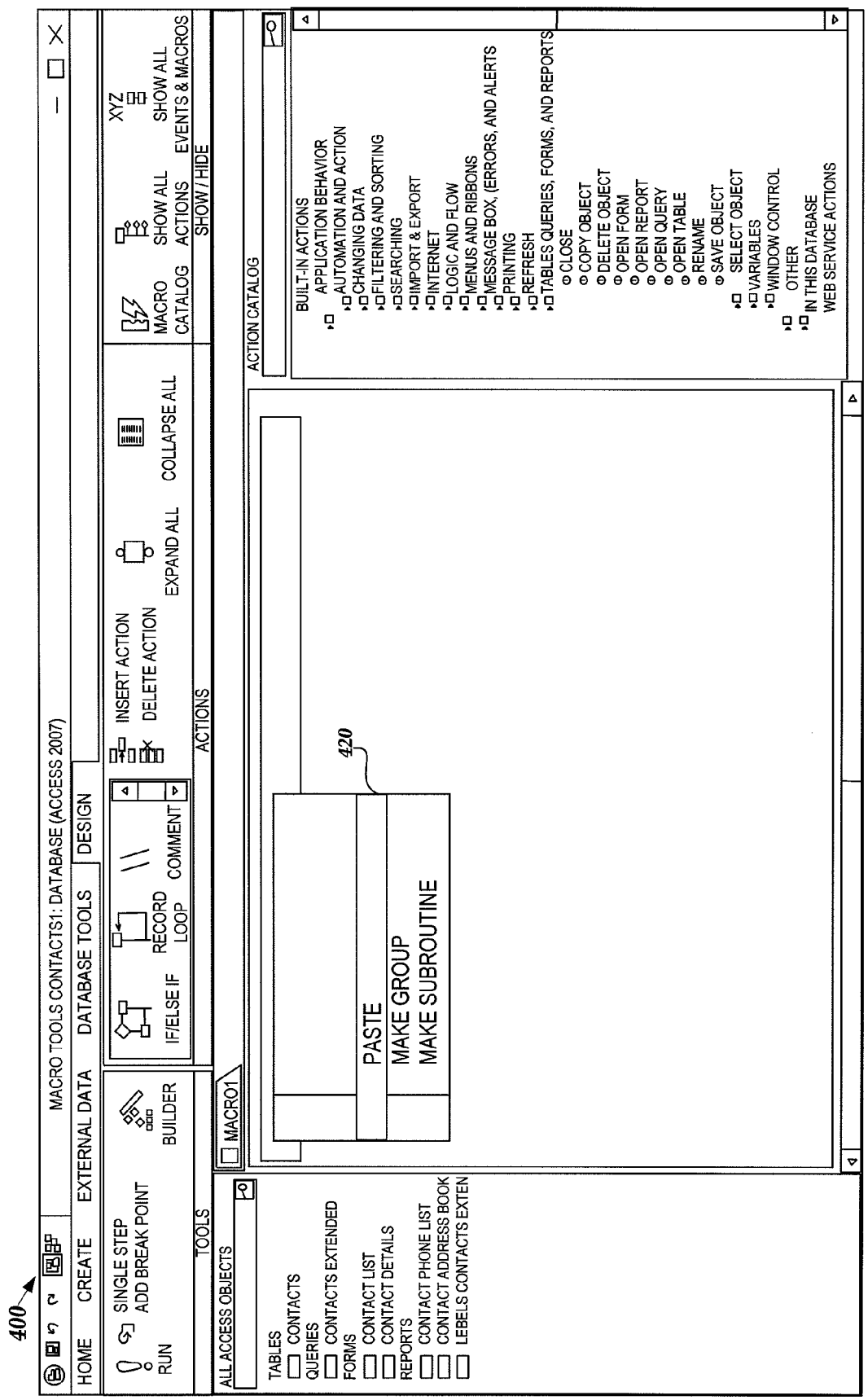
FIG. 4 is an illustrative computer screen display of a user interface control for pasting markup language data onto a macro design surface, in accordance with one embodiment.

FIG. 4 is an illustrative computer screen display 400 of a user interface control for pasting copied markup language data 56 from the clipboard onto a macro design surface, in accordance with one embodiment. The display 400 includes a macro design surface 410 for creating macros utilizing the macro object data 60, which may be generated by the database application program 50. The display 400 also includes a user interface control 420 which may be initiated by a user via a right-click operation, as one non-limiting example, with a mouse in the database application program 50. The user interface control 420 includes a Paste operation which a user may select to paste copied markup language data 56 from a clipboard as macro object data 60 onto the macro design surface 410. In particular, and as will be described in greater detail herein, the Paste operation may be utilized to translate the copied markup language data 56 into macro object data in accordance with the object hierarchy described above in FIG. 2 on the macro design surface 410.

Figure 5:
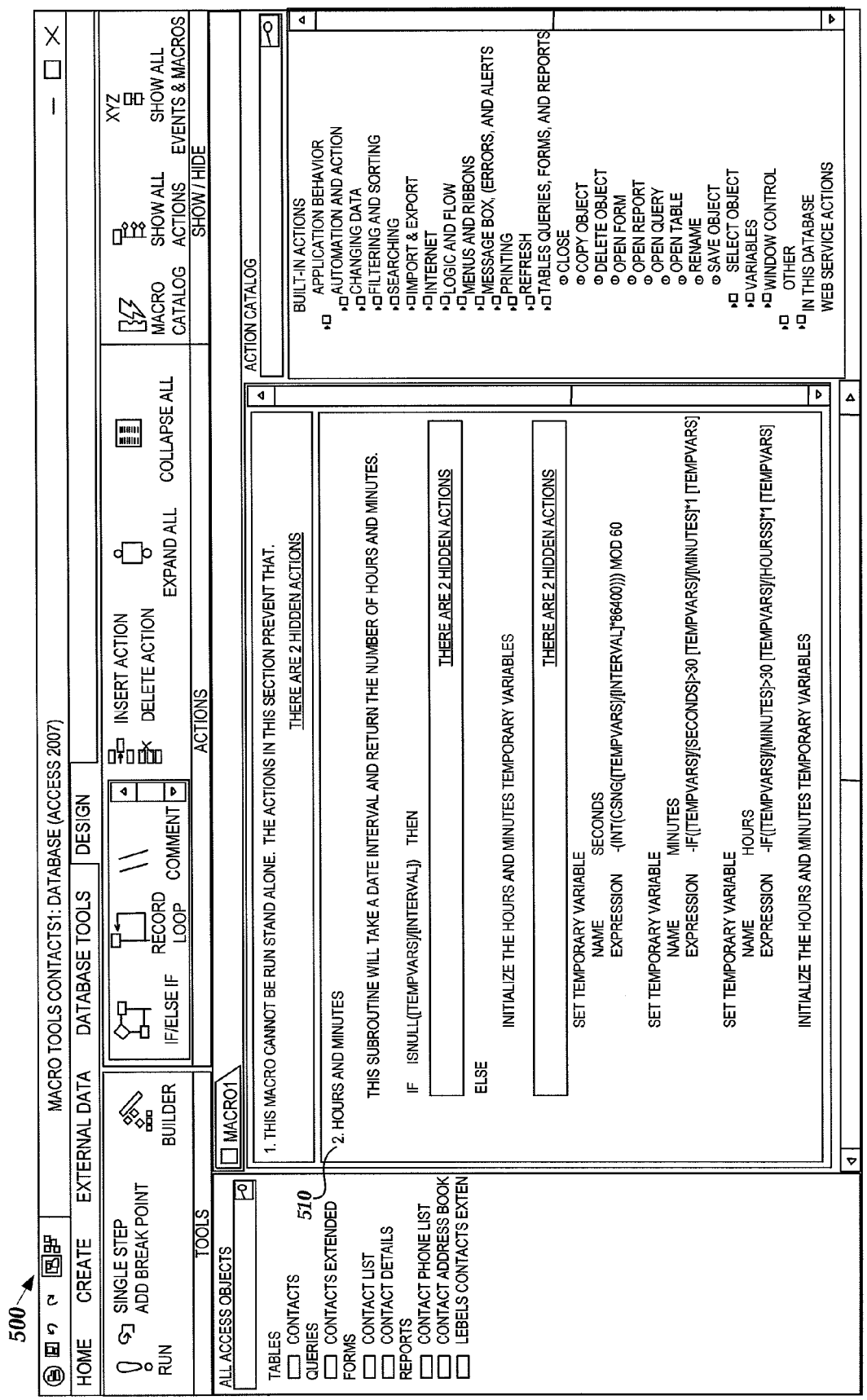
FIG. 5 is an illustrative computer screen display of markup language data rendered as macro object data on a macro design surface after a paste operation, in accordance with one embodiment.

FIG. 5 is an illustrative computer screen display 500 of markup language data rendered as macro object data on a macro design surface after a paste operation, in accordance with one embodiment. The display 500 includes macro object data 510 translated from the markup language data 56 by the database application program 50. The macro object data 510 may be utilized in a macro for calculate the time elapsed between a start time and an end time of a project created by the database application program 50.

Figure 6:
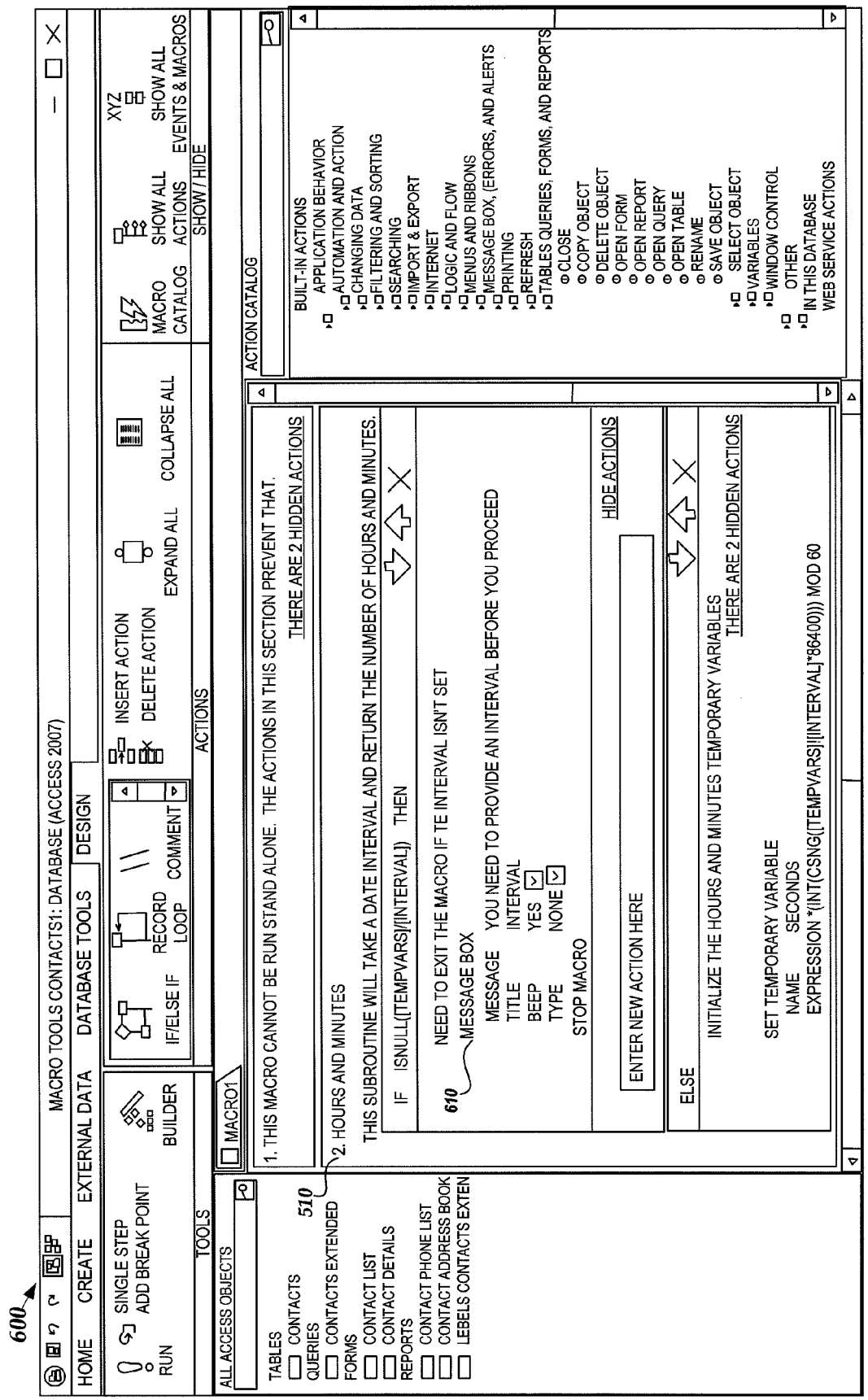
FIG. 6 is an illustrative computer screen display of markup language data rendered as macro object data which is inserted into existing macro object data on a macro design surface after a paste operation, in accordance with one embodiment.

FIG. 6 is an illustrative computer screen display 600 of markup language data rendered as macro object data which is inserted into existing macro object data on a macro design surface after a paste operation, in accordance with one embodiment. The display 600 includes an Action macro object 610 which has been inserted into the existing macro object data 510 by the database application program 50. Similar to the macro object data 510, the Action macro object 610 may have been previously translated from markup language data. The Action macro object 610 may also include user interface elements for providing additional information needed for executing the macro and for stopping execution of the macro.

Figure 7:
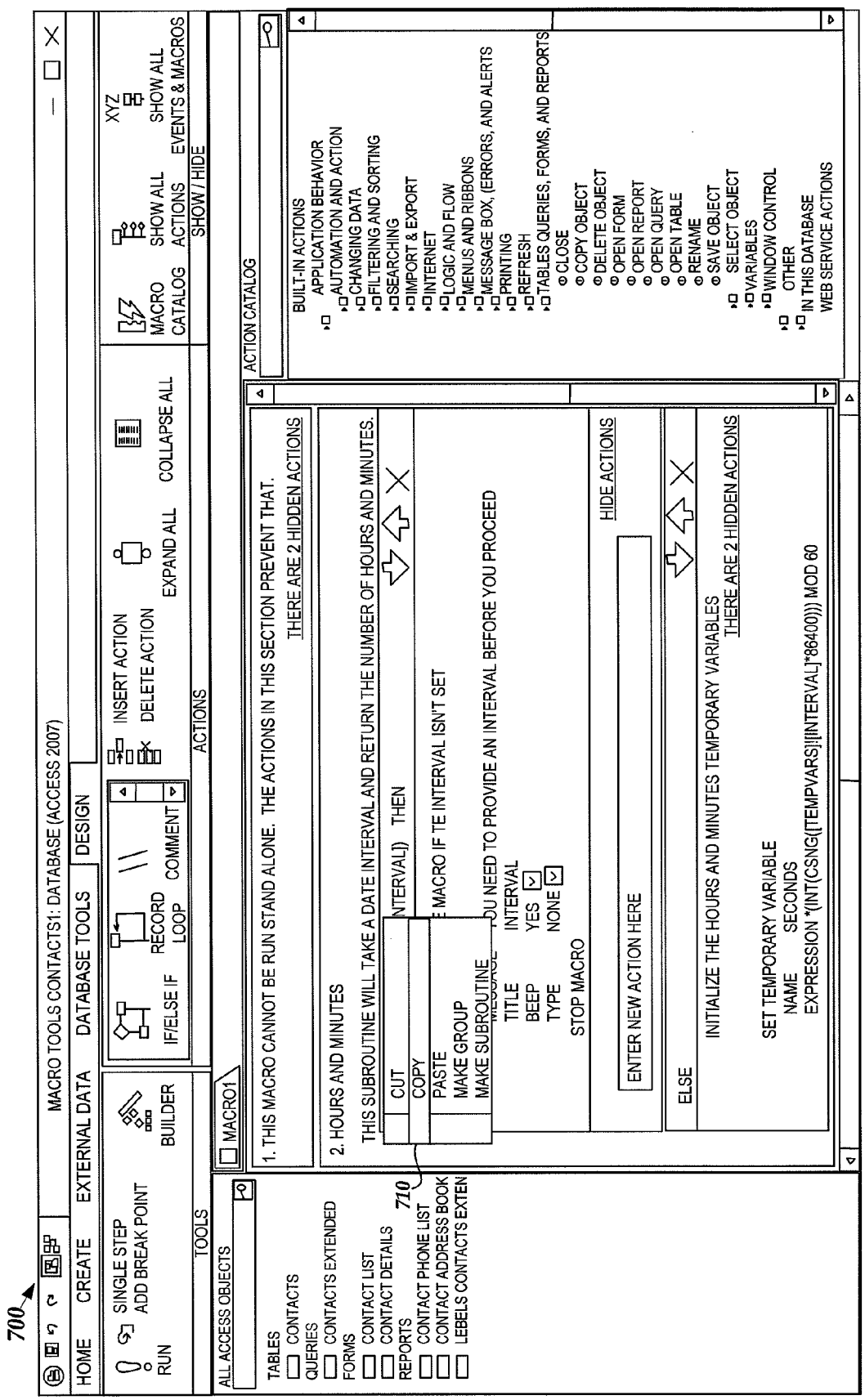
FIG. 7 is an illustrative computer screen display of a user interface control for copying macro object data from a macro design surface, in accordance with one embodiment.

FIG. 7 is an illustrative computer screen display 700 of a user interface control for copying macro object data from a macro design surface, in accordance with one embodiment. The display 400 includes a macro design surface 410 for creating macros utilizing the macro object data 60, which may be generated by the database application program 50. The display 700 also includes a user interface control 710 which may be initiated by a user via a right-click operation with a mouse in the database application program 50. The user interface control 710 includes a Copy command which a user may select to copy selected macro object data 60 from the macro design surface onto a clipboard. In accordance with various embodiments and as will be described in greater detail below, the database application program 50, in response to receiving the Copy command, may be operative to automatically convert the selected macro object data 60 into markup language data.

Figure 8:
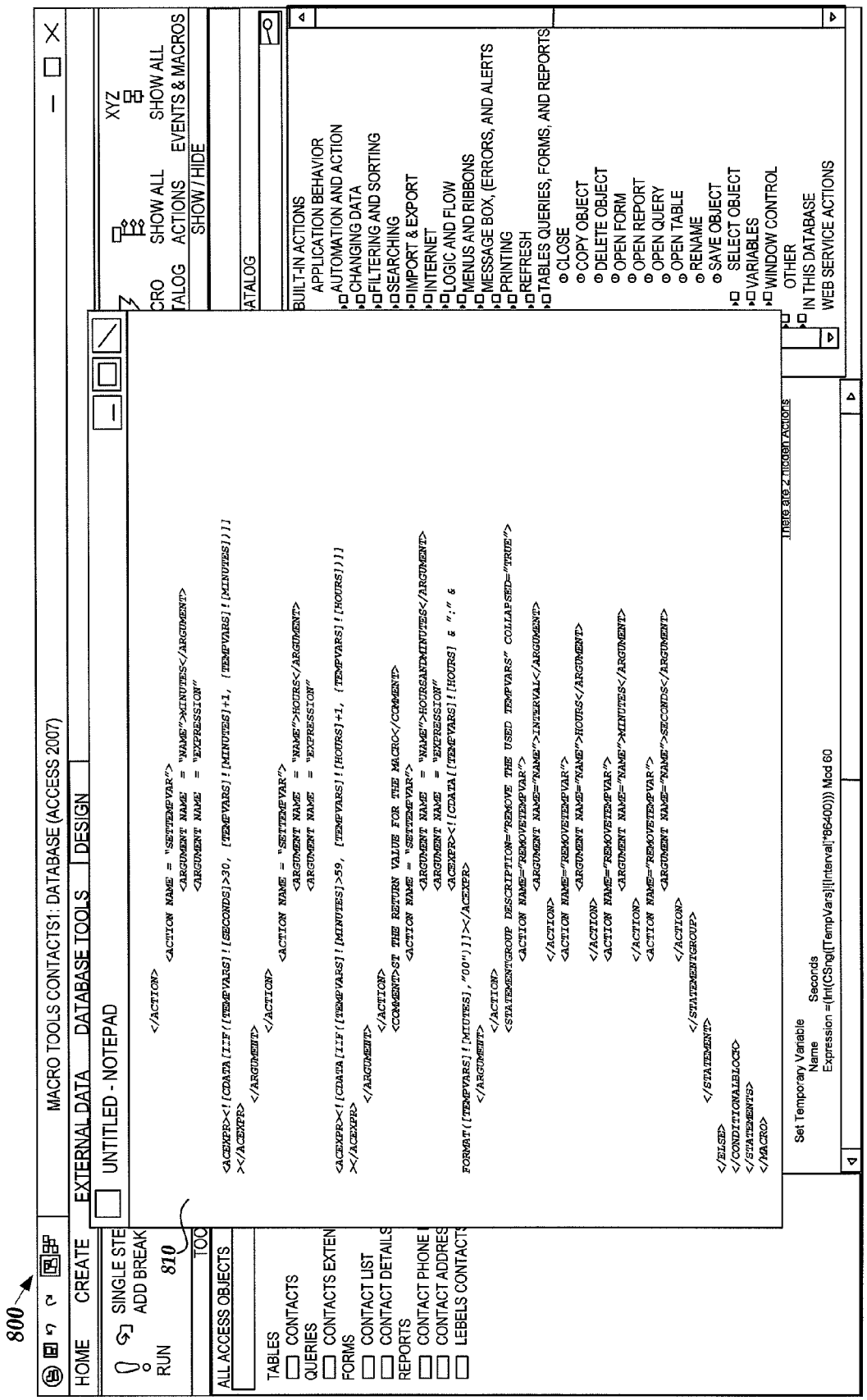
FIG. 8 is an illustrative computer screen display of macro object data rendered as markup language data in a text editor application after a paste operation, in accordance with one embodiment.

FIG. 8 is an illustrative computer screen display 800 of macro object data rendered as markup language data in a text editor application after a paste operation, in accordance with one embodiment. The display 800 includes an open text editor application 810 (e.g., "Notepad") which displays markup language data representing the macro object data 60 copied onto the clipboard from the macro design surface displayed in FIG. 7.

Figure 9:
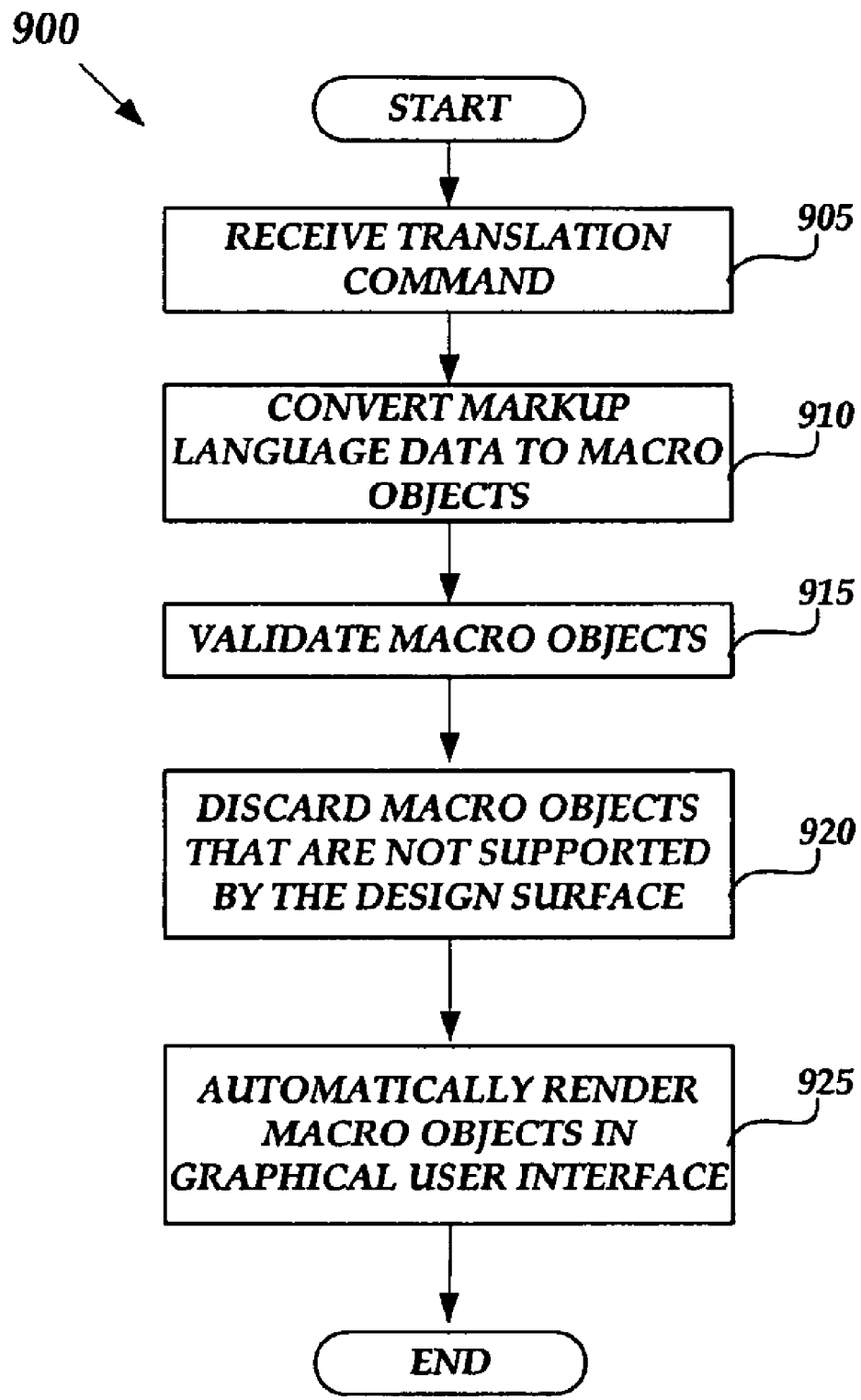
FIG. 9 is a flow diagram illustrating a routine for rendering markup language data representing a macro as macro objects in a graphical user interface on a display device, in accordance with one embodiment.

FIG. 9 is a flow diagram illustrating a routine 900 for rendering markup language data representing a macro as macro objects in a graphical user interface on a display device, in accordance with one embodiment. The components, objects, and computer screen displays of FIGS. 1-7 are referred to in the description of FIGS. 9 and 10, but the embodiments are not so limited. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 9 and 10 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 900 begins at operation 905, where the database application program 50 executing on the computer 2 receives a translation command in a graphical user interface. In particular, the database application program 50 may receive a paste command from the user interface control 420 (see FIG. 4) to translate or convert markup language text which has been copied to the clipboard from a data source, to macro objects for display on the design surface 410. The markup language data 56 may have been previously copied to the clipboard as a result of a copy command from any recognizable text source. For example, the markup language data 56 may have been copied from an electronic mail message or a web page.

From operation 905, the routine 900 continues to operation 910, where the database application program 50, in response to receiving the translation or paste command, automatically converts the markup language data received from the clipboard into macro objects. As discussed above with respect to FIG. 2, the macro objects may include various macro operations which make up a macro including, but not limited to, actions, comments, for loops, conditional statements, subroutines, and groups.

From operation 910, the routine 900 continues to operation 915, where the database application program 50 validates the macro objects converted from the markup language data. In particular, the database application program 50 in validating the macro objects may determine whether the markup language data or envelope 56 (i.e., the XML structure encasing the macro objects) is valid with respect to an insert location for rendering the macro objects on the design surface, determine whether a macro type associated with the converted macro objects is the same as a macro type associated with the insert location for rendering the macro objects on a design surface in the user interface, and determine whether the macro objects to be rendered at the insert location are supported by the design surface. For example, some macro objects such as groups and subroutines which may not be supported in a given macro may be discarded by the database application program 50.

From operation 915, the routine 900 continues to operation 920, where the database application program 50 discards markup language data or envelope 56 if it is determined that the envelope is either invalid or not understood at the insert location, discards macro objects that are not supported by the design surface in the graphical user interface, and flags one or more macro objects from the macro objects which are not understood by the design surface. From operation 920, the routine 900 continues to operation 925, where the database application program 50 automatically renders the macro objects converted from the markup language data in the graphical user interface. It should be understood that in accordance with one embodiment, the macro objects may be rendered in the graphical user interface as an entire macro (as shown in the display 500 of FIG. 5) or inserted into existing macro objects in a current hierarchy rendered in the interface (as shown in the display 600 of FIG. 6). From operation 920, the routine 900 then ends.

Figure 10:
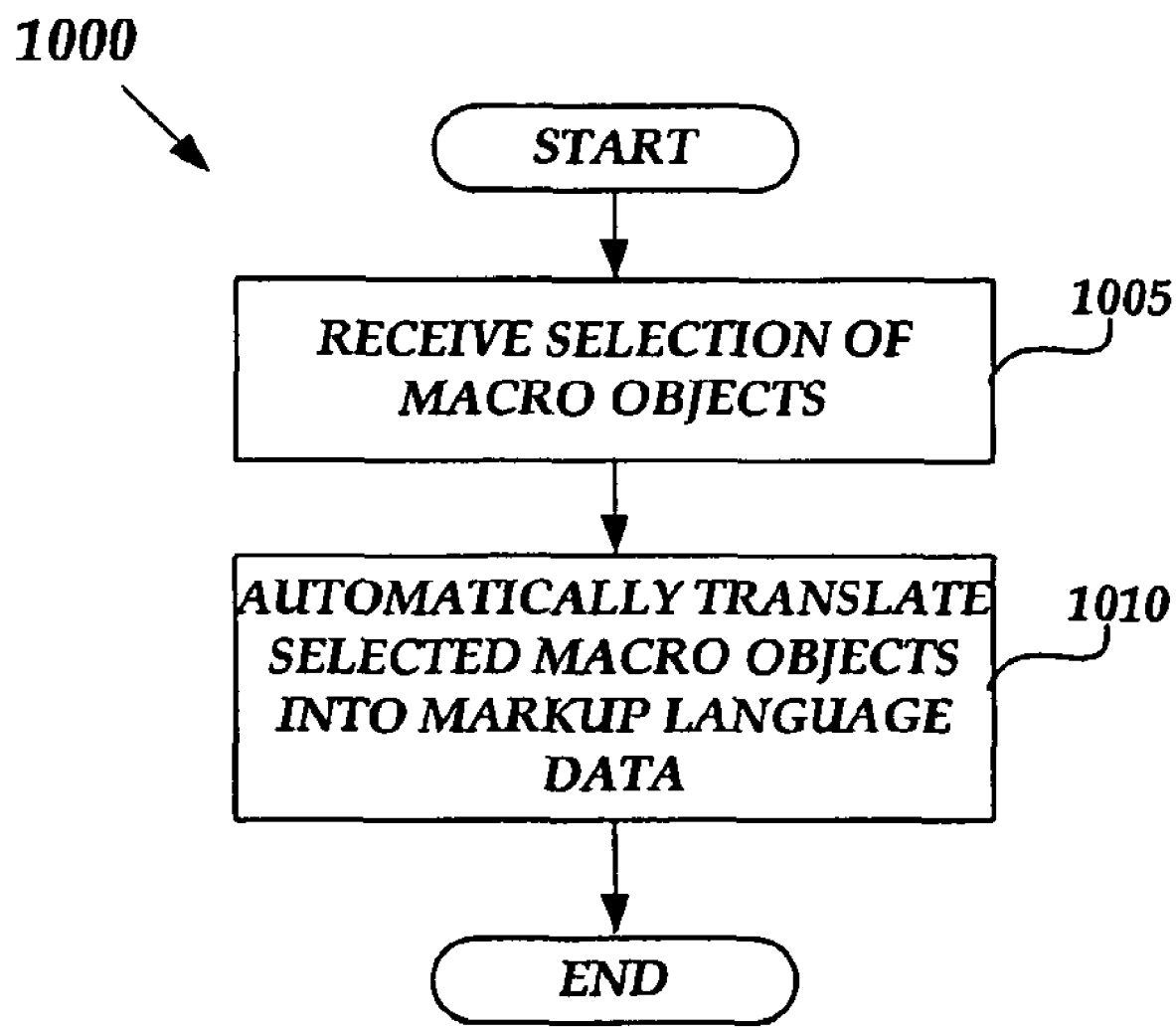
FIG. 10 is a flow diagram illustrating a routine for converting macro objects into markup language data, in accordance with one embodiment.

FIG. 10 is a flow diagram illustrating a routine 1000 for converting macro objects into markup language data, in accordance with one embodiment. The routine 1000 begins at operation 1005, where the database application program 50 executing on the computer 2 receives a selection of macro objects from the graphical user interface. In particular, the database application program 50 may receive a copy command from the user interface control 710 (see FIG. 7) to convert selected macro object data into markup language data.

From operation 1005, the routine 1000 continues to operation 1010, where the database application program 50 automatically translates or converts the selected or copied macro objects into markup language data. The database application program 50 may further be configured to automatically place the markup language data converted from the selected macro objects in a clipboard so that they may viewed as markup language text in a text editor application or any other application for viewing markup language data, as shown in the display 810 of FIG. 8. From operation 1010, the routine 1000 then ends.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method in a computer system for rendering markup language data representing a macro as macro objects in a graphical user interface on a display device, comprising:
   receiving a translation command in the user interface to paste the markup language data to a plurality of macro objects for display on a design surface in the graphical user interface, the plurality of macro objects representative of the macro, wherein the markup language data comprises an envelope, the envelope comprising a markup language structure for encasing the plurality of macro objects, and wherein the markup language data has been copied to a clipboard from a data source;
   in response to receiving the translation command, converting the markup language data to the plurality of macro objects;
   validating the plurality of macro objects, wherein validating the plurality of macro objects comprises:
      determining whether the envelope is valid with respect to an insert location for rendering the plurality of macro objects on the design surface;
      determining whether a macro type associated with the plurality of macro objects is the same as a macro type associated with the insert location for rendering the plurality of macro objects on the design surface; and
      determining that the plurality of macro objects to be rendered on the design surface at the insert location are supported by the design surface; and
   automatically rendering the plurality of macro objects on the design surface in the graphical user interface.

2. The method of claim 1, wherein automatically rendering the plurality of macro objects on the design surface in the graphical user interface, comprises inserting the plurality of macro objects into a current hierarchy of macro objects rendered on the design surface.

3. The method of claim 2, wherein inserting the plurality of macro objects into a current hierarchy of macro objects rendered on the design surface comprises inserting the plurality of macro objects into a macro tree, the macro tree comprising a hierarchical arrangement of a plurality of objects corresponding to a plurality of macro categories, the hierarchical arrangement comprising a single base-level object for defining logic utilized in the macro and at least one object below the base level object.

4. The method of claim 1, further comprising:
discarding the envelope if it is determined that the envelope is at least one of invalid and not understood at the insert location for rendering the plurality of macro objects on the design surface discarding macro objects from the plurality of macro objects that are not supported by the design surface; and
flagging macro objects from the plurality of macro objects as not understood by the design surface.

5. The method of claim 1, wherein receiving a translation command to paste the markup language data to a plurality of macro objects for display on a design surface in the graphical user interface comprises receiving markup language text from the clipboard, wherein the markup language text has been copied to the clipboard from a recognizable text source, the recognizable text source comprising at least one of a web page and an e-mail message.

6. The method of claim 1, wherein converting the markup language data to the plurality of macro objects comprises converting the markup language data to a plurality of macro operations, wherein the macro operations comprise at least one the following: actions, comments, for loops, conditional statements, subroutines, and groups.

7. A computer-readable storage device containing computer executable instructions which, when executed on a computer, will cause the computer to perform a method for converting macro objects in a macro as markup language data representing the macro objects, the method comprising:
receiving a translation command in the user interface to paste the markup language data to a plurality of macro objects for display on a design surface in the graphical user interface, the plurality of macro objects representative of the macro, wherein the markup language data comprises an envelope, the envelope comprising a markup language structure for encasing the plurality of macro objects, and wherein the markup language data has been copied to a clipboard from a data source;
in response to receiving the translation command, converting the markup language data to the plurality of macro objects;
validating the plurality of macro objects, wherein validating the plurality of macro objects comprises:
determining whether the envelope is valid with respect to an insert location for rendering the plurality of macro objects on the design surface;
determining whether a macro type associated with the plurality of macro objects is the same as a macro type associated with the insert location for rendering the plurality of macro objects on the design surface; and
determining that the plurality of macro objects to be rendered on the design surface at the insert location are supported by the design surface; and
automatically rendering the plurality of macro objects on the design surface in the graphical user interface.

8. The computer-readable storage device of claim 7, wherein automatically translating the selected macro objects into the markup language data comprises automatically placing the markup language data in a clipboard.

9. The computer-readable storage device of claim 7, wherein the plurality of the macro objects belongs to a hierarchical object model.

10. The computer-readable storage device of claim 7, wherein the plurality of the macro objects comprises at least following macro operations: actions, comments, for loops, conditional statements, subroutines, and groups.

11. A method in a computer system of utilizing a database application program for rendering markup language data representing a macro as macro objects in a graphical user interface on a display device, comprising:
receiving a paste command in the user interface to translate copied markup language data to a plurality of macro objects for display on a design surface in the graphical user interface, the plurality of macro objects representative of the macro, wherein the markup language data comprises an envelope, the envelope comprising a markup language structure for encasing the plurality of macro objects and wherein the markup language data has been copied to a clipboard from a data source; and in response to receiving the paste command,
translating the markup language data to the plurality of macro objects;
inserting the plurality of markup macro objects into a current hierarchy of macro objects rendered on the design surface;
validating the plurality of macro objects, wherein validating the plurality of macro objects comprises:
determining whether the envelope is valid with respect to an insert location for rendering the plurality of macro objects on the design surface;
determining whether a macro type associated with the plurality of macro objects is the same as a macro type associated with the insert location for rendering the plurality of macro objects on the design surface; and
determining that the plurality of macro objects to be rendered on the design surface at the insert location are supported; and
automatically rendering the plurality of macro objects on the design surface in the graphical user interface.

12. The method of claim 11 further comprising:
discarding the envelope if it is determined that the envelope is at least one of invalid and not understood at the insert location for rendering the plurality of macro objects on the design surface;
discarding the markup language data from the clipboard after automatically rendering the plurality of macro objects on the design surface in the graphical user interface; and
flagging macro objects from the plurality of macro objects as not understood by the design surface.

13. The method of claim 11 further comprising storing an object hierarchy associated with the plurality of macro objects in a memory after automatically rendering the plurality of macro objects on the design surface in the graphical user interface.

14. The method of claim 11, wherein receiving a paste command in the user interface to translate copied markup language data to a plurality of macro objects for display on a design surface in the graphical user interface comprises receiving markup language text from the clipboard, wherein the markup language text has been copied to the clipboard from a recognizable text source, the recognizable text source comprising at least one of a web page and an e-mail message.

15. The method of claim 11, wherein translating the markup language data to the plurality of macro objects comprises converting the markup language data to a plurality of macro operations, wherein the macro operations comprise one or more of the following: actions, comments, for loops, conditional statements, subroutines, and groups.

* * * * *